US011612900B2

(12) United States Patent
Van Den Bosch et al.

(10) Patent No.: US 11,612,900 B2
(45) Date of Patent: Mar. 28, 2023

(54) CYCLONE SEPARATION DEVICE

(71) Applicant: KONINKLIJKE PHILIPS N.V., Eindhoven (NL)

(72) Inventors: Michael Van Den Bosch, Eindhoven (NL); Johannes Tseard Van Der Kooi, Eindhoven (NL); Mark Elzinga, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 17/433,270

(22) PCT Filed: Feb. 10, 2020

(86) PCT No.: PCT/EP2020/053228
§ 371 (c)(1),
(2) Date: Aug. 24, 2021

(87) PCT Pub. No.: WO2020/173689
PCT Pub. Date: Sep. 3, 2020

(65) Prior Publication Data

US 2022/0040711 A1 Feb. 10, 2022

(30) Foreign Application Priority Data

Feb. 25, 2019 (EP) .................................... 19159139

(51) Int. Cl.
*B01D 45/00* (2006.01)
*B04C 5/185* (2006.01)
(Continued)

(52) U.S. Cl.
CPC ............ *B04C 5/185* (2013.01); *A47L 9/1608* (2013.01); *A47L 9/1658* (2013.01); *A47L 9/1683* (2013.01);
(Continued)

(58) Field of Classification Search
CPC ........... B04C 5/185; B04C 5/103; B04C 5/13; B04C 2005/136; A47L 9/1608;
(Continued)

(56) References Cited

U.S. PATENT DOCUMENTS 6,896,720 B1 5/2005 Arnold et al.
8,316,507 B2 * 11/2012 Hyun ...................... A47L 9/165 15/353

(Continued)

FOREIGN PATENT DOCUMENTS

CN 1334061 A 2/2002
CN 1739441 A 3/2006

(Continued)

OTHER PUBLICATIONS

Extended European Search Report issued in connection with corresponding EP Application No. 19159139.5 dated Jul. 29, 2019.

(Continued)

*Primary Examiner* — Dung H Bui
(74) *Attorney, Agent, or Firm* — Schott, P.C.

(57) ABSTRACT

A cyclone separation device includes a cyclone chamber for separating dirt from incoming air, a dirt collecting chamber arranged adjacent to the cyclone chamber for collecting dirt particles separated from air, and a dirt duct between the cyclone chamber and the dirt collecting chamber for allowing dirt particles to exit the cyclone chamber into the dirt collecting chamber. To reduce the generation of noise-generating air vortices, the dirt duct has an edge protruding into a direction at an angle to the dirt duct at an exit ridge of the cyclone chamber that is first encountered by the air rotating in the cyclone chamber. Preferably, the edge is formed by a tangential extension of a wall of the cyclone chamber. A vacuum cleaner advantageously includes such a cyclone separation device.

11 Claims, 1 Drawing Sheet

(51) Int. Cl.
*A47L 9/16* (2006.01)
*B04C 5/103* (2006.01)
*B04C 5/13* (2006.01)

(52) U.S. Cl.
CPC ................ *B04C 5/103* (2013.01); *B04C 5/13* (2013.01); *B04C 2005/136* (2013.01)

(58) Field of Classification Search
CPC .... A47L 9/1658; A47L 9/1683; A47L 9/0081; B01D 45/16
See application file for complete search history.

(56) References Cited

U.S. PATENT DOCUMENTS

| | | | | |
|---|---|---|---|---|
| 9,820,622 | B2 | 11/2017 | Van Der Kooi et al. | |
| 10,695,775 | B1 * | 6/2020 | Hedrick | B04C 5/103 |
| 2002/0011052 | A1 * | 1/2002 | Oh | B01D 45/16 55/424 |
| 2002/0011053 | A1 | 1/2002 | Oh | |
| 2002/0062531 | A1 * | 5/2002 | Oh | B01D 45/16 15/353 |
| 2002/0189451 | A1 * | 12/2002 | Morgan | A47L 9/1683 95/268 |
| 2004/0237482 | A1 | 12/2004 | Lim et al. | |
| 2006/0102005 | A1 | 5/2006 | Oh et al. | |
| 2014/0373307 | A1 | 12/2014 | Van Der Kooi et al. | |
| 2016/0353954 | A1 | 12/2016 | Kleine-Doepke et al. | |
| 2019/0001348 | A1 * | 1/2019 | Ingram | B01D 45/12 |
| 2020/0237171 | A1 * | 7/2020 | Xu | A47L 9/1683 |

FOREIGN PATENT DOCUMENTS

| | | | |
|---|---|---|---|
| CN | 101940454 | A | 1/2011 |
| CN | 102626298 | A | 8/2012 |
| CN | 104010556 | A | 8/2014 |
| JP | 2003-199695 | A | 7/2003 |
| JP | 2003236410 | A | 8/2003 |
| JP | 2014083221 | A | 5/2014 |

OTHER PUBLICATIONS

International Search Report and Written Opinion issued in connection with corresponding PCT Application No. PCT/EP2020/053228 dated May 20, 2020.

* cited by examiner

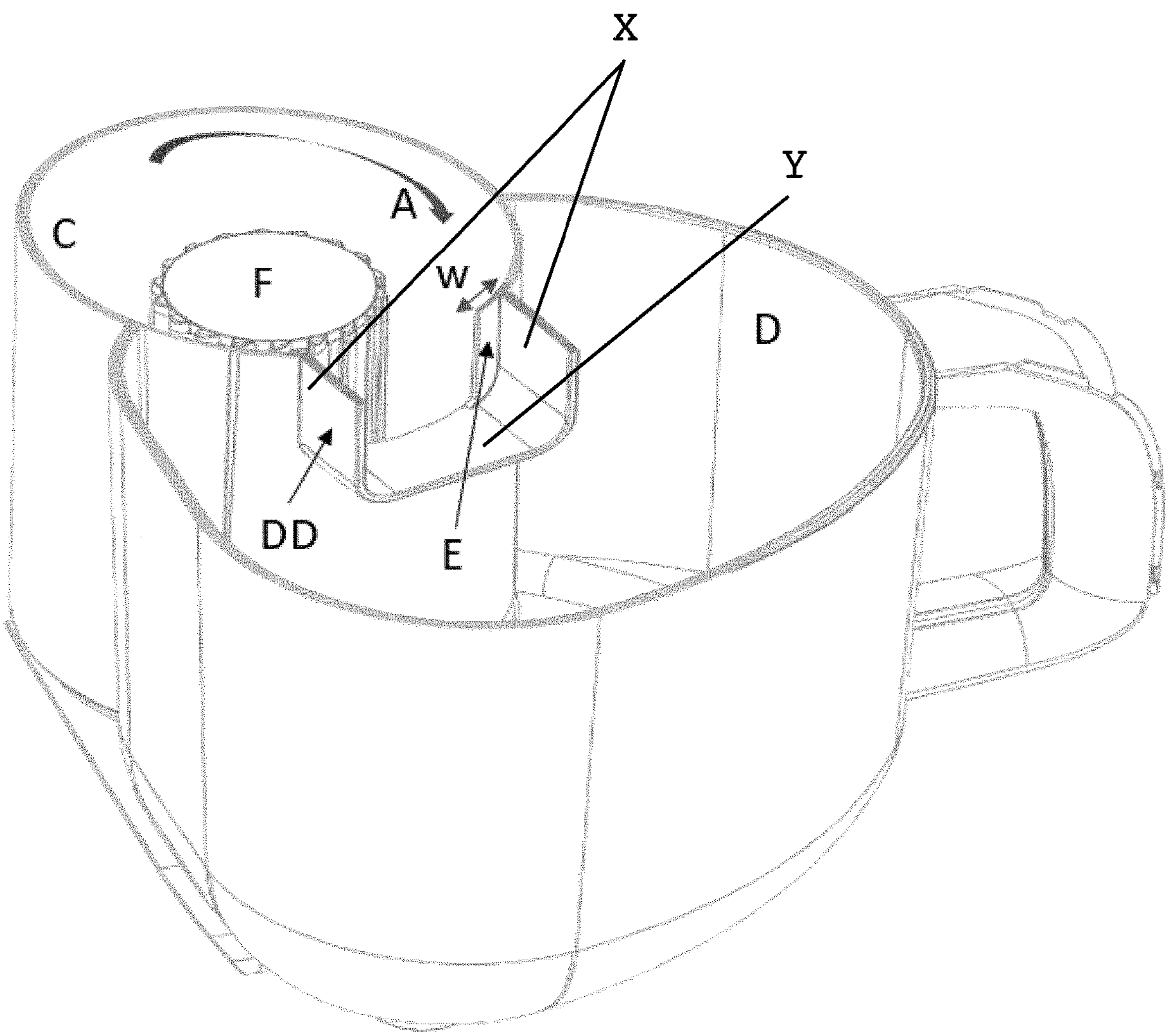
X
Y
A
C
F
W
D
DD
E

CYCLONE SEPARATION DEVICE

CROSS-REFERENCE TO RELATED APPLICATIONS

The present application is a U.S. National Phase application under 35 U.S.C. § 371 of International Application No. PCT/EP2020/053228, filed on Feb. 10, 2020, which claims the benefit of European Patent Application No. 19159139.5, filed on Feb. 25, 2019. These applications are hereby incorporated by reference herein.

FIELD OF THE INVENTION

The invention relates to a cyclone separation device, and to a vacuum cleaner comprising such a cyclone separation device.

BACKGROUND OF THE INVENTION

A cyclone technology can be used in a bag-less vacuum cleaner to separate dirt particles from the dirty air flowing through the appliance. The dirt particles are collected in a special dust bucket after separation from the main air flow. Cyclone separators allow vacuum cleaners to maintain a constant vacuuming performance. The air enters the cyclone chamber at the bottom and will flow cyclonic due to the geometry. Dirt particles are pushed outwards by the generated centrifugal forces and follow a spiral path upwards towards the exit of the cyclone chamber into the dust bucket. The air flow in the cyclone chamber will exit the system at the center. The air inside the cyclone chamber is spinning fast and passes the exit ridges at the top. Due to the large gap in combination with the ridges, vortices are generated that result in air pulsations. These are being amplified by the volumes and shapes of the dust bucket and cyclone chamber exit (resembling the main volume and the neck of a standard Helmholtz resonator mechanism). An example of this mechanism is blowing over the open mouth of a bottle.

US2014373307 discloses a cyclone separation device for separating particles from air and a cyclone vacuum cleaner. It has the objective to reduce noise without impairing the dirt separation performance. This is achieved by an arrangement comprising a cyclone chamber, a dirt collecting chamber arranged adjacent to the cyclone chamber for collecting dirt particles separated from air, a dirt-duct between the cyclone chamber and the dirt collecting chamber for allowing dirt particles to pass from the cyclone chamber towards the dirt collecting chamber, and an air-guide arranged adjacent to the dirt-duct for reducing the momentum of the air in the dirt-duct.

SUMMARY OF THE INVENTION

It is, inter alia, an object of the invention to provide an improved cyclone separation device generating even less noise. The invention is defined by the independent claims. Advantageous embodiments are defined in the dependent claims.

An aspect of the invention provides a cyclone separation device that comprises a cyclone chamber for separating dirt from incoming air, a dirt collecting chamber arranged adjacent to the cyclone chamber for collecting dirt particles separated from air, and a dirt duct between the cyclone chamber and the dirt collecting chamber for allowing dirt particles to exit the cyclone chamber into the dirt collecting chamber. To reduce the generation of noise-generating air vortices, the dirt duct has an edge protruding into a direction at an angle to the dirt duct at an exit ridge of the cyclone chamber that is first encountered by the air rotating in the cyclone chamber. Preferably, the edge is formed by a tangential extension of a wall of the cyclone chamber. Preferably, a width of the edge is at least 5 mm, and more preferably at least 8 mm, and even more preferably 12 mm. A vacuum cleaner advantageously comprises such a cyclone separation device.

Embodiments of the invention provide a solution having a special new shaped dirt outlet geometry from the cyclone chamber towards the dust bucket that does not need the disruptor part inside the cyclone chamber of US2014373307. Vortex shedding at the first exit ridge of the dirt exit is limited. These vortices are responsible for the alternating forces attenuating the mass of the Helmholtz system. Limiting the vortex shedding means that the size of the vortices becomes smaller. By creating a sharp exit ridge, the vortex shedding is less. This solution, placed parallel to the main flow direction, is therefore not influencing the rotational movement of the air column in the cyclone chamber. This results in significantly better separation performance as well as a reduced tonal noise level. Herein, the expression “sharp” means that air cannot easily follow the surface along which it is flowing so as to enter the dirt duct, as the air would have to make a turn of at least 90° if it wished to follow that surface so as to enter the dirt duct. As a result of this need to make a turn of at least 90° if the air wished to follow the surface along which it is flowing, the ability for the air to generate large vortices resulting in disturbing noise levels is impeded.

These and other aspects of the invention will be apparent from and elucidated with reference to the embodiments described hereinafter.

BRIEF DESCRIPTION OF THE DRAWINGS

FIG. 1 shows an embodiment of a cyclone separation device in accordance with the present invention.

DESCRIPTION OF EMBODIMENTS

FIG. 1 shows an embodiment of a cyclone separation device in accordance with the present invention. Like in US2014373307, the cyclone separation device has a cyclone chamber C, a dirt collecting chamber D arranged adjacent to the cyclone chamber C for collecting dirt particles separated from air, a dirt duct DD between the cyclone chamber C and the dirt collecting chamber D for allowing dirt particles to pass from the cyclone chamber C towards the dirt collecting chamber D. As shown in the FIGURE, the dirt duct DD may generally extend in a longitudinal direction that is radial to the cyclone chamber C. The cyclone chamber C may have a cylinder-shaped vortex finder F having a plurality of stationary vanes at its outer circumference, or some other air exit for allowing air with a reduced amount of dirt to leave the cyclone chamber C. Air A is rotating clockwise in the cyclone chamber C. As shown, the dirt duct DD includes a pair of opposite side walls X and a bottom wall Y adjoining the pair of opposite side walls X. The dirt duct DD is integral to the cyclone chamber C and extends into the dirt collection chamber D and the bottom wall Y connects to the exit ridge of the cyclone chamber D.

In accordance with a feature of the present invention, an edge E protrudes into the dirt duct DD at a first exit ridge R of the dirt duct DD. As a result, air cannot easily exit the cyclone chamber C into the dirt duct DD, and thus cannot easily produce vortices that result in noise. In this example, the edge E is formed by a tangential extension of the cyclone chamber wall, and has the same thickness as that wall. A width w of the edge E is at least 5 mm, and preferably at least 8 mm, and more preferably 12 mm. It is practical if the edge E extends along the entire height H of the dirt duct DD, as shown.

It should be noted that the above-mentioned embodiments illustrate rather than limit the invention, and that those skilled in the art will be able to design many alternative embodiments without departing from the scope of the appended claims. The dirt duct DD may have a roof. The edge E might also be a serrated edge, or an edge placed at an angle with regard to the air flow direction, etc. . . . in order to negate coherent vortex shedding. For example, the edge E may be perpendicular to a wall of the dirt duct DD. The thickness of the edge E may be different from the thickness of the wall of the cyclone chamber C. In general, preventing coherent (simultaneously generated) vortices reduce the attenuation of the Helmholtz system. To improve cleanability, a space between the edge E and the wall of the dirt duct DD may be filled so that dirt does not stick in that space, provided that this is not done in such a way, that air can easily follow a curve from the cyclone chamber C into the dirt duct DD.

Apart from use in vacuum cleaners, the invention can be used in cyclone applications which can be found in different industries like the mining industry, air treatment systems, etc.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, but the cyclone chamber C and the dirt collecting chamber D may also be molded in one piece. In the device claim enumerating several means, several of these means may be embodied by one and the same item of hardware. Measures recited in mutually different dependent claims may advantageously be used in combination.

The invention claimed is:

1. A cyclone separation device, comprising:
- a cyclone chamber to separate dirt from air;
- a dirt collecting chamber, arranged adjacent to the cyclone chamber, to collect dirt particles separated from the air; and
- a dirt duct between the cyclone chamber and the dirt collecting chamber to allow the dirt particles to exit the cyclone chamber into the dirt collecting chamber, wherein the dirt duct includes a pair of opposite side walls and a bottom wall adjoining the pair of opposite side walls, and wherein the dirt duct has an edge protruding into a direction at an angle to the dirt duct at an exit ridge of the cyclone chamber that is first encountered by the air rotating in the cyclone chamber,
- wherein the dirt duct is integral to the cyclone chamber and extends into the dirt collecting chamber, and wherein the bottom wall connects to the exit ridge of the cyclone chamber.

2. The cyclone separation device as claimed in claim 1, wherein the edge is formed by a tangential extension of a wall of the cyclone chamber.

3. The cyclone separation device as claimed in claim 1, wherein a width of the edge is at least 5 mm.

4. The cyclone separation device as claimed in claim 3, wherein the width of the edge is at least 8 mm.

5. The cyclone separation device as claimed in claim 3, wherein the width of the edge is at least 12 mm.

6. The cyclone separation device as claimed in claim 1, wherein the edge extends along an entire height of the dirt duct.

7. The cyclone separation device as claimed in claim 1, wherein the dirt duct extends in a longitudinal direction that is radial to the cyclone chamber.

8. A vacuum cleaner comprising the cyclone separation device as claimed in claim 1.

9. The cyclone separation device as claimed in claim 2, wherein a thickness of the edge is different from a thickness of the wall of the cyclone chamber.

10. The cyclone separation device as claimed in claim 1, wherein the cyclone chamber comprises a cylinder-shaped vortex finder having a plurality of stationary vanes at an outer circumference.

11. The cyclone separation device as claimed in claim 1, wherein the edge is perpendicular to a wall of the dirt duct.

* * * * *